Figure 1:
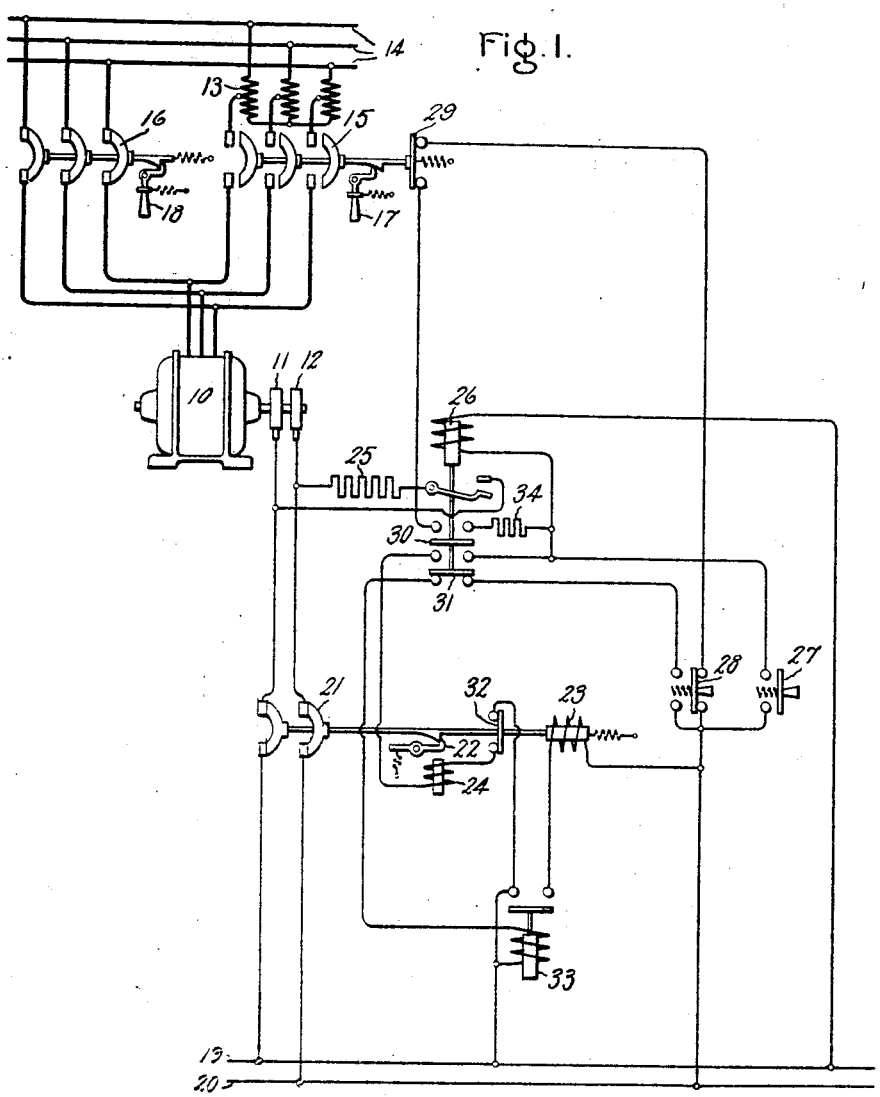

Jan. 24, 1928.

A. C. FINNEY 1,657,251

ELECTRIC CONTROL SYSTEM

Filed June 5, 1924

2 Sheets-Sheet 1

Inventor:
Alfred C. Finney,
by Alexander S. Lanz
His Attorney.

Jan. 24, 1928.

A. C. FINNEY 1,657,251

ELECTRIC CONTROL SYSTEM

Filed June 5, 1924     2 Sheets-Sheet 2

Inventor.
Alfred C. Finney.
by Alexander S. Lunt
His Attorney.

Patented Jan. 24, 1928.

1,657,251

UNITED STATES PATENT OFFICE.

ALFRED C. FINNEY, OF SCHENECTADY, NEW YORK, ASSIGNOR TO GENERAL ELECTRIC COMPANY, A CORPORATION OF NEW YORK.

ELECTRIC CONTROL SYSTEM.

Application filed June 5, 1924. Serial No. 717,923.

My invention relates to the control of dynamo electric machines and more particularly to the control of field windings of such machines and it has for its principal object the provision of a control system employing electromagnetic switch mechanism for insuring that a field winding of a machine may be connected to and disconnected from a field discharge circuit and a source of energizing current in a predetermined sequence.

It is an ordinary practice when disconnecting the field winding of a dynamo electric machine, particularly a shunt field winding, to connect a discharge circuit including a resistor of suitable ohmic value to the field winding in order to maintain the voltage induced by the collapsing magnetic field within safe limits at the instant of opening the energizing circuit. Heretofore mechanical switching arrangements have been provided to insure the closure of the discharge circuit before opening the energizing circuit of the field winding as well as the opening of the discharge circuit before closing the energizing circuit. However, when remotely controlled electromagnetically actuated field switch mechanism is employed, particularly with high voltage machines, the complication arising in mechanically arranging the respective field and discharge switches for operation in the proper sequence as well as in properly insulating the switches to prevent flashover, renders such arrangements undesirable if not impractical.

Hence, one of the objects of my invention is to provide independent electromagnetic switches, which are arranged to be operated in the proper sequence under the control of push button switches, for controlling the connections of the field winding to the energizing source and to the discharge circuit.

Another object of the present invention is to provide electromagnetic switch mechanism for connecting the field winding of a dynamo electric machine to either of two sources of energizing current and for insuring that the field winding of the machine is connected to and disconnected from each of the sources of energizing current and a field discharge circuit in a predetermined sequence.

Although not necessarily limited thereto, my invention is of particular utility when applied to control the field winding of an alternating current synchronous motor, particularly where the field winding is arranged to be energized from either a shaft driven exciter or from direct current supply buses. When such machines are started and accelerated to substantially synchronous speed by means of amortiseur windings, it is sometimes necessary that the field windings be open circuited during the starting period in order to maintain the starting current of the motor within desirable limits.

Therefore, a further object of my invention is to provide means for insuring that the field winding of such a machine is disconnected from the source of energizing current as well as from the discharge circuit before closure of the motor starting switch.

Figure 2:
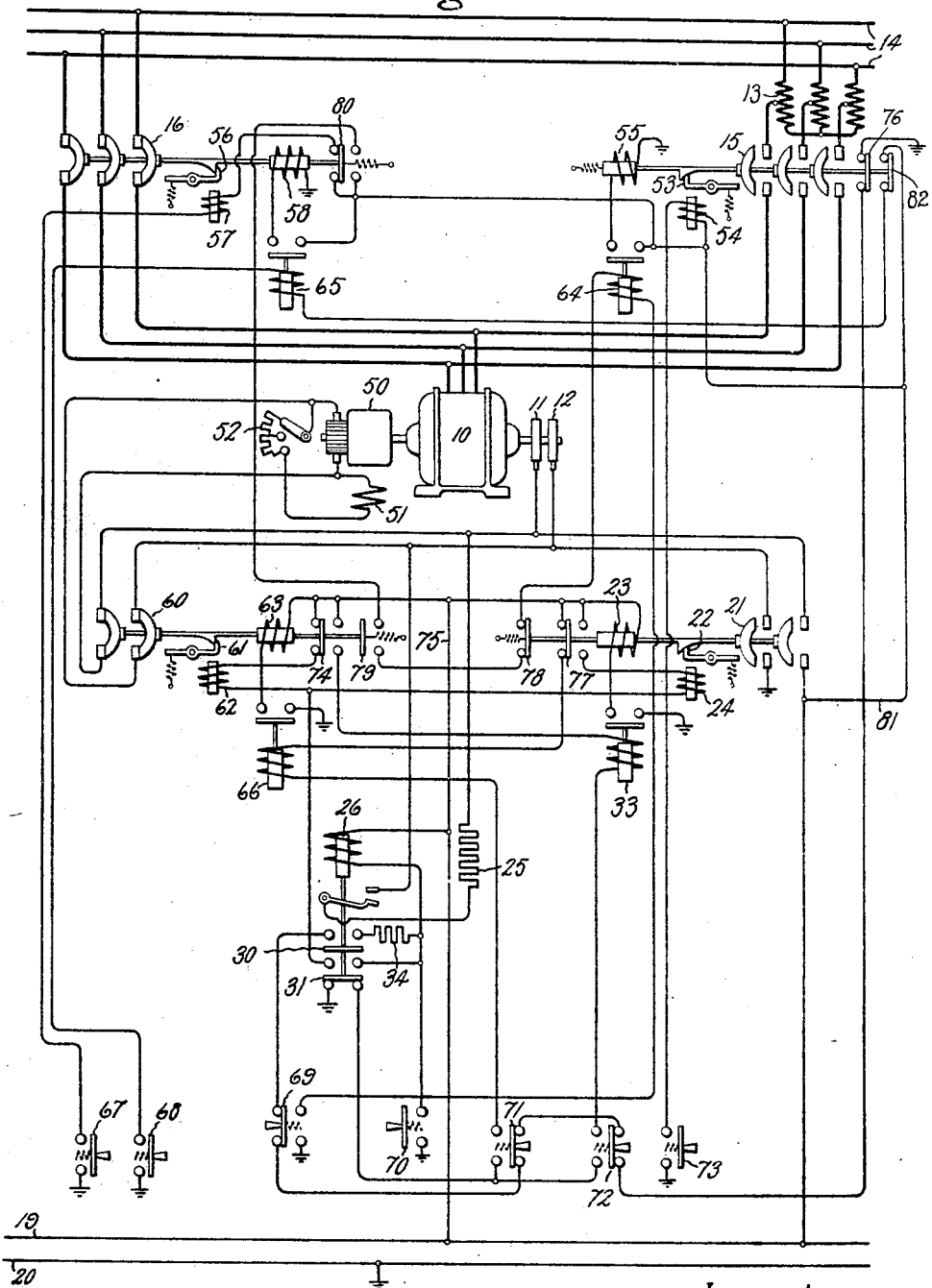

For a better understanding of my invention reference is had to the following description in connection with the accompanying drawings in which Fig. 1, diagrammatically shows my invention applied to control the connection of the field winding of an alternating current synchronous motor to a discharge circuit and a single source of energizing current and Fig. 2, illustrates the invention applied to a similar machine having the field winding arranged to be energized from either of two sources.

Referring to Fig. 1 of the drawings, the alternating current synchronous motor 10, is provided with a field winding which is connected directly to the slip rings 11 and 12 in the usual manner and with armature windings which are arranged to be connected to the three phase supply lines 14 either through the starting transformer 13 and the starting switch 15 or through the running switch 16. As shown each of the switches 15 and 16 is biased to the open position by a suitable spring and is arranged to be held in the closed position by the mechanical latches 17 and 18 respectively.

The field winding of motor 10 is energized from the direct current supply lines 19 and 20 and the electromagnetic field switch 21 is provided for controlling the energizing circuit thereof. The field switch 21 is of the type which is normally biased to the open position and mechanically latched in the closed position by the latch 22 and is provided with a closing winding 23 and a tripping winding 24 for operating the switch 21 respectively from the open to the closed position and from the closed to the open position.

In order to limit the induced voltage and to absorb the electrical energy discharged from the field winding of motor 10 when the field switch 21 is open, a discharge circuit including the resistor 25 is arranged to be closed by the electromagnetic switch 26 which is normally biased to the open position as shown.

To effect the proper sequence of operation of the field switch 21 and the discharge switch 26 in controlling the connection of the field winding of motor 10 to the discharge circuit and to the supply lines 19 and 20, the manual control switches or push buttons 27 and 28 together with the auxiliary contact mechanisms 29, 30, 31, 32 and the relay 33 are provided and interconnected in a manner which will be more fully described in connection with the operation of my invention. The manual control switch 27 is biased to the open position shown while the control switch 28 is operable between two circuit controlling positions and is biased to the position illustrated.

As thus constructed and arranged and with the parts in their respective positions shown in Fig. 1 the operation of my invention is as follows: Assume that the alternating current supply lines 14 as well as the direct current supply lines 19 and 20 are connected to suitable sources of electrical energy and that the dynamo electric machine 10 is normally operating at synchronous speed with the armature windings connected to the supply lines through the running switch mechanism 16 and with the field winding connected to the supply lines 19 and 20 through the field switch 21. If now, after releasing the latch 18 to open the running switch 16 and disconnect the armature windings of the motor 10 from the supply lines 14, it should be desired to disconnect the field winding from the supply lines 19 and 20, control switch 27 is operated from the open position shown to the closed position. This completes an energizing circuit for the operating winding of electromagnetic switch 26, from the supply lines 19 through the operating winding, and the control switch 27 to the other supply line 20. Upon the response of electromagnetic switch 26, the field discharge circuit including the resistor 25 is closed and simultaneously an energizing circuit for the tripping winding 24 is completed from the supply line 20 through the control switch 27, the auxiliary contact 31 in its upper position, the tripping winding 24 and the auxiliary contact 32 to the other supply lines 19. The tripping winding 24 at once releases latch 22, thus permitting the field switch 21 to open according to its bias and thereby disconnect the field winding of motor 10 from the supply lines 19—20. The inductive energy of the field winding will be dissipated in the discharge resistor 25 and the induced voltage in the field winding is restrained to a safe value.

It will be observed that upon the opening of field switch 21 the auxiliary contact 32 is moved to the open position thus effecting the deenergization of the tripping winding 24. Also upon the closure of the electromagnetic switch 26 a holding circuit for the operating winding thereof is established in shunt with the control switch 27 through the current limiting resistance 34, the auxiliary contact 30, the auxiliary contact 29 and the normally closed control switch 28. This serves to maintain the energization of the operating winding of switch 26 at a safe value for continuous operation after the control switch 27 has been released and returned to the open position according to its bias.

To restart the motor 10, the starting switch 15 is operated to the closed position and held therein by the mechanical latch 17. As switch 15 is moved to the closed position, the auxiliary contact 29 opens and interrupts the holding circuit for the electromagnetic switch 26 through the current limiting resistance 34. Switch 26 thereupon opens the discharge circuit of the field winding of motor 10 and hence when the starting switch 15 is closed, the armature windings of motor 10 are connected to the supply lines 14 with the field winding open circuited.

The rotor of motor 10 is provided with the usual amortisseur windings (not shown) by means of which motor 10 starts as an induction motor and is accelerated to approximately synchronous speed. After motor 10 has accelerated the starting switch 15 is opened by tripping the latch 17 and the running switch 16 then is closed to connect the armature windings of motor 10 directly to the supply lines 14.

To reconnect the field winding to the direct current supply lines 19 and 20 for synchronous operation of motor 10, the manual controlled switch 28 is operated from the position shown to the second position in which a circuit is established from the supply line 20 through the control switch 28, the auxiliary contact 31 of switch 26, and the winding of relay 33 to the other supply line 19. Relay 33 at once responds to connect the closing winding 23 of the field switch 21 across the direct current supply line, and the field switch 21 is operated to the closed position and held therein by the mechanical latch 22. After the closure of field switch 21 and the consequent energization of the field winding of motor 10 from the supply lines 19 and 20, the control switch 28 may be released to return to the position shown according to its bias, thus deenergizing the winding of relay 33.

From the foregoing it will be evident that the electromagnetic switch 26 is energized to close the discharge circuit before the opening of the field switch 21 and likewise is deenergized to open the discharge circuit before the closure of the field switch 21.

Referring now to Fig. 2, it will be seen that the motor 10 is provided with a shaft driven direct current exciter 50 which has a shunt field winding 51 and a regulating resistance 52 therefor and which may be employed alternately with the direct current supply lines 19 and 20 for energizing the field winding connected to the slip rings 11 and 12 of motor 10. In the system illustrated the starting switch 15 for motor 10 is of the electromagnetic type which is biased to the open position and held in the closed position by a latch 53 which is under the control of the tripping winding 54 and is operated from the open position to the closed position by the closing winding 55. The running switch 16 likewise is provided with a latch 56 for maintaining the switch in the closed position and a tripping winding 57 therefor for releasing the latch as well as a closing winding 58 for operating the switch from the open to the closed position. It will be observed that an electromagnetic field switch 60, similar to the field switch 21, is provided for connecting the field winding of motor 10 to the exciter 50 and is held in the closed position by the mechanical latch 61 which is under the control of the tripping winding 62. Field switch 60 is operated from the open position to which it is biased to the closed position by the closing winding 63. The closing windings of starting switch 15, running switch 16 and field switch 60 are each controlled by the relays 64, 65 and 66 respectively in order satisfactorily to interrupt the relatively large currents required.

The several manual controlled switches 67, 68, 69, 70, 71, 72 and 73 are each biased to the position shown and cooperate with the auxiliary contact mechanism with which each of the electromagnetic switches 15, 16, 21, 60 and 26 are provided in controlling the operation thereof in a manner which will be more clearly understood from a description of the operation of my invention as illustrated in Fig. 2 which is as follows:

Assuming the alternating current supply lines 14 and the direct current supply lines 19 and 20 are suitably energized, it will be observed that the motor 10 is shown connected to the alternating current supply lines 14 through the running switch 16 and is operating at normal speed with the field winding connected to the direct current exciter 50 through the field switch 60. If it should be desired to disconnect the field winding of motor 10 from the direct current exciter 50 and connect the same to receive exciting current from the direct current supply lines 19 and 20, this readily may be accomplished in the following manner. The control switch 70 first is operated to the closed position to connect the operating winding of field discharge switch 26 across the supply lines 19 and 20, the latter of which it will be observed is shown as grounded. Discharge switch 26 at once closes the discharge circuit for the field winding of the motor 10 through the resistance 25 and at the same time establishes an energizing circuit for the tripping winding 62 of field switch 60 extending from ground through the control switch 70, the auxiliary contact 31 of the discharge switch 26 in its upper position, the tripping winding 62, the auxiliary contact 74 of field switch 60 and the conductor 75 to the supply line 19. Upon the resulting release of the mechanical latch 61, the field switch 60 returns to the open position according to its bias and the discharge resistance 25 absorbs the inductive discharge of the field winding and limits the voltage thereof in the manner previously described.

It will be observed that upon the closure of the discharge switch 26 a holding circuit for the operating winding thereof is completed from the supply line 19 through the winding of switch 26, the resistance 34, the auxiliary contact 30 and successively through the control switches 69, 71 and 72 and the auxiliary contact 76 of the starting switch 15 to ground. This maintains the discharge switch 26 in the closed position after the control switch 70 has been released to return to the open position according to its bias.

Control switch 72 now is operated from the position shown to its second position thus interrupting the holding circuit just described to permit the discharge switch 26 to return to the open position shown and at the same time to close an energizing circuit for the relay 33 which may be traced from ground through the auxiliary contact 31 of the discharge switch 26, the control switch 72 in its second position, the winding of relay 33, the auxiliary contact 74 of field switch 60 in its right hand operative position and the conductor 75 to the supply line 19. Relay 33 at once responds to complete the energizing circuit for the closing winding 23 of the field switch 21 which extends from ground through the contact of relay 33 the closing winding 23 and the conductor 75 to the supply line 19. Thereupon the field switch 21 is operated to the closed position and mechanically latched therein and the field winding of motor 10 is energized from the direct current supply lines 19 and 20.

Motor 10 may be stopped at any time by operating the control switch 67 to the closed position thus energizing the tripping winding 57 of the running switch 16 from the direct current supply lines 19 and 20 through a circuit including auxiliary contact 80 and conductor 81. After the resulting opening of running switch 16, the field winding of motor 10 may be disconnected from the supply lines 19 and 20 by operation of the manual control switch 70 to the closed position. This again energizes the discharge switch 26 which thereupon closes the discharge circuit through the resistance 25 and energizes the tripping winding 24 of field switch 21 through a circuit extending from ground through the control switch 70, the auxiliary contact 31 of discharge switch 26 in its upper position, the tripping winding 24 of field switch 21, the auxiliary contact 77 in the right hand position, and the conductor 75 to the supply line 19. This effects the release of latch 22 of field switch 21 and the latter returns to the open position shown to disconnect the field winding of motor 10 from the supply lines 19 and 20. Again the discharge resistance 25 dissipates the energy stored in the field winding. Upon closure of the discharge switch 26, a holding circuit therefor again is completed through the current limiting resistance 34 which maintains the switch 26 closed after the release of control switch 70.

If it should be desired to restart the motor 10, the control switch 69 may be operated from the position shown to its second position to both interrupt the holding circuit of discharge switch 26 and close an energizing circuit for the relay 64 which extends from ground through the control switch 69 in its right hand position, the winding of relay 64, the auxiliary contacts 78 and 79 of field switches 21 and 60 respectively, the auxiliary contact 80 of running switch 16 in the open position, and the conductor 81 to the supply line 19. The resulting closure of relay 64 energizes the closing winding 55 of starting switch 15 in an obvious manner and the latter is operated from the open position in which it is shown to the closed position, thereby connecting the armature windings of motor 10 through the starting transformer 13 to the supply line 14. The rotor of motor 10 is provided with the usual amortisseur winding so that motor 10 starts as an induction motor and accelerates nearly to synchronous speed. From the foregoing it will be evident that the starting switch 15 may be closed only when the discharge switch 26, the field switches 21 and 60 and the running switch 16 are each in the open position. This insures that the motor 10 always is started with the field winding open circuited.

After the motor 10 has accelerated to substantially synchronous speed the latch 53 of starting switch 15 is released by closing the control switch 73, thereby energizing the tripping winding 54 from the direct current supply lines 19 and 20. Starting switch 15 returns to the open position according to its bias. Thereupon the control switch 68 may be closed to establish an energizing circuit for the relay 65 which includes the auxiliary contact 82 of starting switch 15 and the conductor 81, thereby insuring that the running switch 16 is not closed until the starting switch 15 has opened. Relay 65 responds to complete an energizing circuit for the closing winding 58 of running switch 16 extending from ground through the closing winding 58, the contact of relay 65 and the conductor 81 to the supply line 19. Switch 16 thereupon is operated to the closed position and connects the armature winding of the motor 10 directly to the supply lines 14.

The field winding of motor 10 then may be connected either to the direct current exciter 50 or to the direct current supply lines 19 and 20 by operation of the control switches 71 and 72 respectively. Should the control switch 71 be operated from the position shown to its second operative position, relay 66 is energized through a circuit extending from ground through the auxiliary contact 31 of the discharge switch 26, the control switch 71, in the left hand position the winding of relay 66, the auxiliary contact 77 of field switch 21 and the conductor 75 to the supply line 19. The closing of the contact of relay 66 completes an energizing circuit for the closing winding 63 of field switch 60 from ground through the contact of relay 66 closing winding 63 and the conductor 75 to supply line 19. Field switch 60 is returned to and latched in the closed position as shown so that the control switch 71 may be released to deenergize relay 66 and consequently the closing winding 63.

From the preceding description it will be evident that the field winding of motor 10 may be connected either to the exciter 50 or the supply lines 19 and 20 by the field switches 60 and 21 respectively, and that the discharge switch 26 must be operated to open the discharge circuit before either of the field switches may be closed and likewise must be operated to close the discharge circuit before either of the field switches are opened.

It will be obvious to those skilled in the art that the control system illustrated in Fig. 2 may be arranged to reverse the connection of the field winding of motor 10 to a single source of energizing current if desired and that the proper sequence of operation of the two field switches and the field discharge circuit switch will be insured at all times.

In accordance with the provisions of the patent statutes I have described the principles of operation of my invention together with the apparatus which I now consider to represent the best embodiment thereof, but I would have it understood that the apparatus shown is only illustrative and that the invention may be carried out by other means.

What I claim as new and desire to secure by Letters Patent of the United States, is:—

1. The combination with a dynamo electric machine having a field winding, of a discharge circuit for said winding, an electromagnetic switch for controlling the connection of said winding to the said discharge circuit, a second electromagnetic switch for controlling the connection of said winding to a source of supply, a pair of manual control switches, auxiliary switch mechanism actuated by the said first electromagnetic switch, and electrical connections jointly controlled by said manual control switches and said auxiliary switch mechanism to insure the closing of said first electromagnetic switch before the opening of said second electromagnetic switch and the opening of said first electromagnetic switch before the closing of said second electromagnetic switch.

2. The combination with a dynamo electric machine having a field winding, of a discharge circuit for said winding, an electromagnetic switch for controlling said discharge circuit, a second electromagnetic switch for controlling the energizing circuit of said field winding, and having an opening and a closing winding, a normally opened control switch operable to the closed position to establish an energizing circuit for said discharge switch, a normally closed control switch operable to interrupt the energizing circuit of said discharge switch, and auxiliary switch mechanism and electrical connections whereby the opening winding of said second electromagnetic switch is energized upon closure of said discharge switch and the closing winding of said second electromagnetic switch is energized upon the opening of said discharge switch.

3. The combination with an electric motor having a field winding, of a discharge circuit for said winding, electromagnetic switch mechanism operable to disconnect said field winding from said discharge circuit before connecting the same to a source of energizing current and to connect said field winding to said discharge circuit before disconnecting the same from said source, a starting switch for said motor, and means controlled by said starting switch for insuring the operation of said switch mechanism to disconnect said field winding from said source and from said discharge circuit before the closure of said starting switch.

4. The combination with an electric motor having a field winding arranged to be excited from either of two sources, of a discharge circuit for said winding, an electromagnetic switch mechanism operable to disconnect said field winding from said discharge circuit before connecting the same to either of the sources and to connect said field winding to said discharge circuit before disconnecting the same from either of the sources, a starting switch for said motor, and means controlled by said starting switch for insuring the operation of said switch mechanism to disconnect said field winding from each of said sources and from said discharge circuit before closure of said starting switch.

5. The combination with an alternating current synchronous motor having a field winding and a shaft driven exciter therefor, of an electromagnetic switch for controlling the connection of said winding to said exciter, a second electromagnetic switch for controlling the connection of said winding to an independent source of supply, a discharge circuit for said field winding, an electromagnetic switch for opening and closing the said circuit, an electromagnetic starting switch for the motor, manual controlled switches for controlling the energization of each of said switches, and auxiliary contact mechanism actuated by said switches and electrical connections controlled thereby for insuring the starting of the motor with said field winding open circuited and the closure of said discharge circuit before the disconnection of said field winding from either the said exciter or the said independent source.

In witness whereof, I have hereunto set my hand this 3rd day of June, 1924.

ALFRED C. FINNEY.